(12) United States Patent
Blowers et al.

(10) Patent No.: US 6,298,474 B1
(45) Date of Patent: Oct. 2, 2001

(54) METHOD AND SYSTEM FOR INTERACTIVELY DEVELOPING A GRAPHICAL CONTROL-FLOW STRUCTURE AND ASSOCIATED APPLICATION SOFTWARE FOR USE IN A MACHINE VISION SYSTEM AND COMPUTER-READABLE STORAGE MEDIUM HAVING A PROGRAM FOR EXECUTING THE METHOD

(75) Inventors: Andrew Blowers, Brighton; Jiri G. Culik, Waterford; Steven F. Prehn, Dexter, all of MI (US)

(73) Assignee: Intergral Vision, Inc., Farmington Hills, MI (US)

( * ) Notice: Subject to any disclaimer, the term of this patent is extended or adjusted under 35 U.S.C. 154(b) by 0 days.

(21) Appl. No.: 09/302,875

(22) Filed: Apr. 30, 1999

(51) Int. Cl.[7] ...................................................... G06F 9/45
(52) U.S. Cl. ................................... 717/1; 700/83; 700/85
(58) Field of Search ............................. 717/1, 4; 700/83, 700/86, 182; 382/154

(56) References Cited

U.S. PATENT DOCUMENTS

| | | | |
|---|---|---|---|
| 4,462,046 | 7/1984 | Spight | 384/94 |
| 4,679,137 | 7/1987 | Lane et al. | 720/83 |
| 4,759,074 | 7/1988 | Iadipaolo et al. | 382/152 |
| 4,833,624 | 5/1989 | Kuwahara et al. | 720/249 |
| 4,914,567 | 4/1990 | Lipkis et al. | 720/83 |
| 5,005,119 | 4/1991 | Rumbaugh et al. | 709/101 |
| 5,157,663 | 10/1992 | Major et al. | 714/10 |
| 5,314,055 | 5/1994 | Gordon | 198/395 |
| 5,327,350 | 7/1994 | Endo | 720/179 |
| 5,383,110 | 1/1995 | Fujita et al. | 700/86 |
| 5,453,933 | 9/1995 | Wright et al. | 700/181 |
| 5,481,712 | 1/1996 | Silver et al. | 717/1 |
| 5,511,147 | 4/1996 | Abdel-Malek | 700/264 |
| 5,574,828 | 11/1996 | Hayward et al. | 706/45 |
| 5,742,504 | 4/1998 | Meyer et al. | 700/83 |
| 5,862,372 | 1/1999 | Morris | 717/1 |
| 5,905,649 | * 5/1999 | Sojoodi et al. | 700/83 |
| 5,920,479 | * 7/1999 | Sojoodi et al. | 700/86 |
| 5,933,353 | * 8/1999 | Abriam et al. | 700/182 |
| 5,933,638 | * 8/1999 | Cencik | 717/4 |
| 5,940,296 | * 8/1999 | Meyer | 700/83 |
| 6,061,602 | * 5/2000 | Meyer | 700/83 |
| 6,064,759 | * 8/1999 | Buckley et al. | 382/154 |

* cited by examiner

Primary Examiner—Mark R. Powell
Assistant Examiner—Hoang-Vu Anthony Nguyen-Ba
(74) Attorney, Agent, or Firm—Brooks & Kushman P.C.

(57) ABSTRACT

A method, a system and a computer-readable storage medium having stored therein a program for interactively developing a graphical control-flow structure and associated application software for use in a machine vision system is provided. The structure is a tree view structure including a control sequence having at least one node. The method includes providing a first set of control programs representing possible machine vision tasks. The first set of control programs defines a first set of standard controls. Hardware operating parameters are provided which correspond to possible hardware. The hardware operating parameters defining a second set of standard controls. Graphical representations of possible hardware and possible machine vision tasks are displayed. Commands are received from a user to select desired hardware operating parameters corresponding to desired hardware and a machine vision graphical representation and its associated first control program corresponding to a desired machine vision task. The tree structure is displayed wherein the selected machine vision graphical representation is a node of the structure and the first control program is linked into the structure. A plurality of separate application processing engines interlinked together are provided for seamlessly communicating results obtained by execution of the selected first control program. The selected first control program is linked with the desired hardware operating parameters to form the application software in response to the commands without the user writing any of the application software.

24 Claims, 9 Drawing Sheets

# METHOD AND SYSTEM FOR INTERACTIVELY DEVELOPING A GRAPHICAL CONTROL-FLOW STRUCTURE AND ASSOCIATED APPLICATION SOFTWARE FOR USE IN A MACHINE VISION SYSTEM AND COMPUTER-READABLE STORAGE MEDIUM HAVING A PROGRAM FOR EXECUTING THE METHOD

CROSS-REFERENCE TO RELATED APPLICATIONS

This application is related to copending application Ser. No. 08/931,227, filed Sep. 16, 1997, entitled "Method and System for Interactively Developing A Graphical Control-flow Structure And Associated Application Software for Use in a Machine Vision System".

TECHNICAL FIELD

This invention relates to methods and systems for interactively developing a graphical control-flow structure and associated application software for use in a machine vision system and computer-readable storage mediums having a program for executing the methods.

BACKGROUND ART

The majority of machine and vision application are one-of-a-kind, "turnkey" inspection systems. These "tools" will have to stay ahead of the ever changing PC industry to achieve acceptable part gauging and measurement, assembly verification, and component cosmetic detail inspection.

Traditionally, vision tools are programmed together within a programming environment such as C++, Delphi, or Visual Basic wherein a set of tools can be created, used and configured together. Although some environments are easier to program than others (e.g. Visual Basic is easier than C++), they still require knowledge of that programming environment.

The U.S. Pat. No. 5,481,712 to Silver et al. discloses a method and system for interactively generating a computer program in "C" for machine vision analysis wherein the program only permits the operator (i.e. programmer) to make only syntactically correct modifications to the program. A menu element displays permissible programming modifications for the location of interest. The menu element incorporates in its display of permissible programming modifications statements for machine vision analysis of an object image such as calls to machine vision, sub-routines and functions. The computer program is programmed via a closed or proprietary package via predefined tools and operations.

The U.S. Pat. No. 4,914,567 to Lipkis et al. provides for a design system using visual language. The system uses a visual user presentation of a control system, including structure, specification and operation. The visual element enables a user to interactively design, modify and explore operating characteristics. A Grafcet-based graphic control-flow language for setting and testing state variables is disclosed. Additional features are: application-artificial vision systems; object-oriented applications platform; top-down design; and setting of variable values. The system links Grafcet and MAP technology.

The U.S. Pat. No. 5,005,119 to Rumbaugh et al. provides for user interactive control of computer programs and corresponding versions of input/output data flow. Programs for a CAD task and their respective data set requirements are visually displayed as a flowgraph with which the user interacts to select input data sets and initiate program executions.

The U.S. Pat. No. 5,327,350 to Endo provides for an interactive-type data input function for controlling the operation of a machine tool by creating a machining program based on input data.

The U.S. Pat. No. 5,383,110 to fujita et al. adds the feature of answering questions displayed on a display screen to generate a numerical control program.

The U.S. Pat. No. 5,157,663 to Kahn provides for an animated user interface for computer program creation, control and execution. The interface enables the user to create programs in an interactive visual manner. Animation is integrated with computer programming to allow a user to visualize programming flow and operation.

The U.S. Pat. No. 4,679,137 to Lane et al. provides for a process control interface system for designer and operator. A dynamic menu element is used during the definition and selection of operating parameters used by a process control program. Each data structure includes value indicia defining the parameters of the data structures.

The U.S. Pat. No. 4,759,074 to Iadipaolo et al. provides for a method for automatically inspecting parts utilizing machine vision and system utilizing same. The system is taught by a series of steps which features are to be inspected. Typical features, as well as tolerances, are defined by the programmer to develop reference data.

The U.S. Pat. Nos. 5,574,828, to Hayward et al., Abdel-Malek 5,511,147, Kuwahara et al. 4,833,624, Wright et al. 5,453,933, Spight 4,462,046, Gordon 5,314,055, each provide general teachings of user interactive programming techniques for robotic or CNC machine tool environments.

The U.S. Pat. No. 5,862,372 to Morris et al. discloses a system for developing applications utilizing standardized objects and multiple views.

The U.S. Pat. No. 5,742,504 to Meyer et al. discloses a method and system for quickly developing application software for use in a machine vision system.

In the automation world (i.e. for PLC's), there exists open standards to define the syntax for automation control.

DISCLOSURE OF INVENTION

An object of the present invention is to provide a method and system for interactively developing application software for use in a machine vision system and computer-readable storage medium having a program for executing the method wherein the user teaches an imaging programming task without writing any code. Consequently, the user need not be a programmer. The user does not write a single line of code, but rather sets variables that the machine vision tools require interactively.

Another object of the present invention is to provide a method and system for interactively developing application software for use in a machine vision system and computer-readable storage medium having a program for executing the method wherein the application software may be developed in a tree hierarchy which allows top-down program development, thereby adapting to the user's thinking.

Yet another object of the present invention is to provide a method and system for interactively developing application software for use in a machine vision system and computer-readable storage medium having a program for executing the method wherein the method, system and storage medium allow the easy integration of third party tools (by using standard controls, such as ActiveX controls). Not only can the standard properties of the controls be inputs or outputs to other tools, but also objects such as geometries can be used as inputs and outputs to other tools.

Yet still another object of the present invention is to provide a method and system for interactively developing application software for use in a machine vision system and computer-readable storage medium having a program for executing the method wherein a plurality of separate application processing engines are interlinked together for seamlessly communicating results obtained by executing a first control program.

In carrying out the above objects and other objects of the present invention, a method is provided for developing a graphical, control-flow structure such as a tree structure and associated application software for use in a machine vision system utilizing a computer system. The structure includes a control sequence having at least one node. The method includes the step of providing a first set of control programs representing possible machine vision tasks. The first set of control programs define a first set of standard controls. The method also includes the step of providing hardware operating parameters corresponding to possible hardware. The hardware operating parameters define a second set of standard controls. The method further includes the step of displaying graphical representations of possible hardware and possible machine vision tasks. Then, the method includes receiving commands from a user to select desired hardware operating parameters corresponding to desired hardware and a machine vision graphical representation and its associated first control program corresponding to a desired machine vision task. The method includes displaying the structure. The selected machine vision graphical representation is a node of the structure. The first control program is linked into the structure. The method further includes providing a plurality of separate application processing engines interlinked together for seamlessly communicating results obtained by execution of the selected first control program. Then, the method includes linking the selected first control program with the desired hardware operating parameters to form the application software in response to the commands without the user writing any of the application software.

Preferably, the application processing engines include a results engine for generating and storing records within a database based on the results.

The desired hardware operating parameters may correspond to a desired image source such as a video camera. The results engine stores images from the video camera within the database based on the results.

Preferably, the method further comprises the step of graphically displaying the results within a rolling results window.

Further in carrying out the above objects and other objects of the present invention, a system is provided for carrying out the method steps and a computer-readable storage medium is provided which has a program for executing the method steps.

The benefits accruing to the method and system of the present invention are numerous. For example, the method and system:

1) Interactively generate/"teach" a machine vision computer program without having to write any code.
2) The tree view interface has now been redefined in that a transition can be either True (the default case), an event generated by some COM control or a Boolean expression defined by an internal variable or properties of any COM Component.
3) A step in the tree view interface is now either any third party COM control method or a mathematical step that allows the definition of new internal variables.
4) A task sequencer environment allows algorithms to be defined in a hierarchy that allows a top-down step approach.
5) Combine vision with control.
6) Allows the seamless integration of any third party COM controls as well as the seamless communication of results between separate application processing engines.

The idea behind interactively generating a computer program is to ensure that the programmer cannot make syntax errors in producing his code. Hence, the environment guides the programmer via menus and appropriate interface structure to produce code that is correct in syntax. The problem being addressed is that computer languages typically are tightly defined and intolerant to syntax errors.

The second idea is that the system operator does not need to be a skilled programmer. Rather, he can be an applications engineer who primarily understands the application and does not need to be a programmer. These days, automation engineers are familiar with ladder logic and tree view structures. Applications knowledgeable engineers tend to be familiar with these environments and the interactive environment being presented in this application is for these engineers.

The method and system of the present application is different from the examples mentioned above in that it takes a standard tree view interface and modifies it to allow the integration of another standard, namely COM controls which can be linked in.

Hence, a first unique feature of this invention is that any third party tools in machine vision or automation or otherwise that are written as COM controls can be seamlessly linked into this interactive environment.

COM controls are becoming widely accepted and many are being produced by many companies. These are able to be linked together and used without writing code that can produce syntax errors. A control sequence is set up triggered on events, timers and variable settings. This interactive task sequencer environment reads the properties of the COM controls and allows these to be set or linked to other properties of other controls. The operator may select which method(s) to run on the control and events fired by controls are used to sequence the logic. Hence, the present invention sets how any third party COM control behaves by viewing the current standard interfaces.

A second feature of the present invention is the menu structure that allows operators to think top-down in the way they program. Hence, we are defining a methodology analogous to the human operator to define an inspection routine. This is addressing the type of person who needs to use the system. We want the operator to have applications knowledge and do not want to necessitate that he also be a programmer.

The general purpose vision method and system of the present invention can be applied to part presence and gauging situations. Software of the invention is configurable to allow: up to 4 cameras per system, all standard camera types, and sequence/IO. The system creates jobs that are programmed through selecting and applying a sequence of tasks. The user is given the ability to access and change individual inspection task parameters. The inspection routines render pass/fail results, but allows for conditional branches within the task sequence (If-Goto). Inspection results are tabulated and made available via a standard database file. The user is allowed to choose to log the following: Failure information (inspection number, failed task, task score), cumulative results, and images.

Software of the present invention is designed to run on distributed hardware platforms using Microsoft Windows NT V4.0 (or later) Operating System. The vision engine component requires VisionBlox V3.0 (or later) and Vision-Blox compatible vision boards and cameras. There are no specific lighting requirements.

The invention exposes another interface (COM) which allows the user to expose his own predefined objects, and have these passed between different COM objects. This defined interface allows for the management of user-defined parameters between different COM controls.

The fourth characteristic of this interactive COM environment is the mathematical component that allows the manipulation of data between COM controls in a user friendly manner.

Glossary

ActiveX Control. A name as defined by Microsoft for programmable elements formerly known variously as OLE Controls, OCXs, or OLE Custom Controls. It uses component technologies built on the Component Object Model (COM). Generally, an ActiveX control is an object that, when instantiated, embodies both specific data and the functions that manipulate it. The ActiveX control is an entity that has state, behavior and identity. An object's state consists of its attributes also known as properties and the attributes' current values. An object's behavior consists of the operations (methods) that can be performed on it and the accompanying state changes. An object's identity is what one uses to distinguish it from other objects. Finally, an ActiveX component has events that inform when something has happened. In contrast, COM objects' behavior is defined by the interfaces it supports. A COM object's state is not explicitly specified, but is implied by its interfaces.

COM. An open architecture for cross-platform development for applications based on object oriented technology as agreed upon by Digital Equipment and Microsoft Corporation. The Component Object Model defines an interface (similar to an abstract base class), Unknown, from which all COM-compatible classes are derived.

COM/DCOM. Component Object Model/Distributed Component Object Model. COM provides interprocess communication (IPC) directly as a service of the operating system. Objects (modules) can be connected outside the process boundaries of an application, therefore new versions of the objects can be instantly supported without changing the source code of the applications that use them.

Engine. A conceptual data processing/control tool, comprised of one or more modular components. An engine is a paradigm for a discrete data processing/control procedure, e.g. file handling, communications, data trending/statistics.

Functionally separate modules ("Engines") interlink in the present application using well defined methodologies (ActiveX, COM/DCOM, ODBC, sockets, named pipes, etc.) Modularization aids in the development of components, spread of development burden, increased flexibility, component reusability, facilitates customization (i.e. generic system to specific configuration without complete application revision), and enforces rigorous design philosophies.

Methods. A procedure that provides access to an object's data and asks an object to behave as defined by the procedure.

Module. An object that contains related functions, methods and properties. Modularization is a key concept in software engineering that has many benefits, especially reusability and code maintenance.

Named Pipes. A connection-oriented protocol, based on Server Message Blocks (SMBs) and NetBIOS, used for communicating between a server process and one or more client processes. It is a communication conduit with two ends. A process with a handle to one end can communicate through a pipe with a process having a handle to the other end. Pipes can be one way (where one end is read-only and the other end is write only) or two way (where both ends of the pipe can be used for reading or writing). The Win32 API provides both anonymous (unnamed) pipes and named pipes.

Object-oriented Design. Or object-oriented programming. In traditional procedural languages (such as C, FORTRAN, and COBOL), code and data are separate. In the object-oriented approach, code and data that belong together can be combined into objects. Object-oriented design is further characterized by the use of inheritance (derived classes), polymorphism, encapsulation and virtual functions (C++) in programming.

Open Database Connectivity (ODBC). ODBC is a component of Microsoft's Windows Open System Architecture (WOSA). It is a method that can be used by Visual Basic applications to communicate with client/server databases, via a set of application program interface (API) calls.

Open. Open for this patent application refers to existing standards that are non-proprietary and used by many companies. In the patent to Silver, open is that yes other people can use this system but it is a proprietary Cognex only standard, and not an open intercompany standard. Visual basic is an open programming language. Visual C++ is an open programming language.

Properties. The attribute of an ActiveX control. This attribute has a value that can either be read, written, or both.

RPL. Rapid programming language. Languages like Visual Basic are rapid programming languages because the programmer can quickly set up user interface and insert objects to achieve his goal. Visual C++ is not regarded as a rapid programming language. Delphi and Visual Basic are regarded as rapid programming languages.

Sockets. An object that represents an endpoint for communication between processes across a network transport (TCP/IP or AppleTalk, for example). Sockets have a type (datagram or stream) and can be bound to a specific network address. Windows Sockets provides an API for handling all types of socket connections under Windows.

VisionBlox™. VisionBlox™ is the tool-kit of machine vision components obeying the ActiveX standards. The components include imaging processing, image acquisition, calibration, geometric functions, and motion control.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
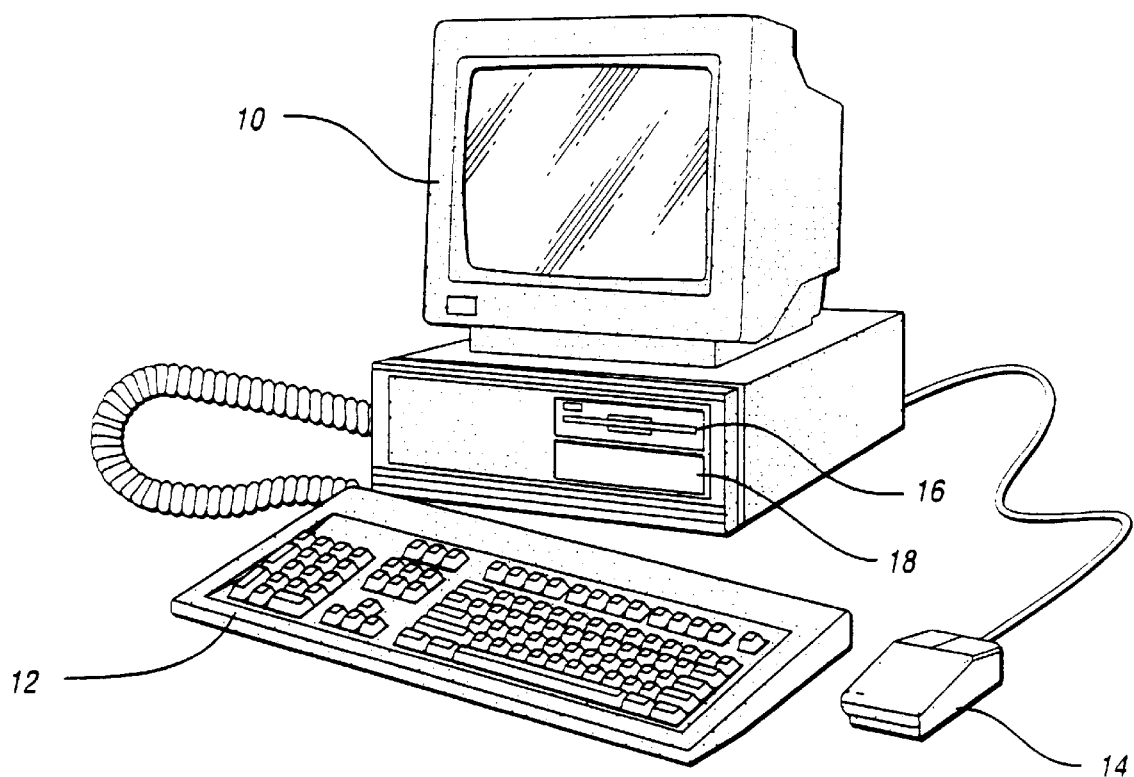
FIG. 1 is a schematic diagram illustrating a preferred hardware configuration on which the method of the present invention can be implemented.

Referring now to the drawings figures, there is illustrated in FIG. 1 a workstation on which the method and system of the present invention can be implemented. However, other configurations are possible. The hardware illustrated in FIG. 1 includes a monitor 10 such as a single SVGA display, a keyboard 12, a pointing device such a mouse 14, a magnetic storage device 16, and a chassis 18 including a CPU and random access memory. The monitor 10 may be a touch screen monitor used in addition to standard keyboard/mouse interaction. In a preferred embodiment, the chassis 18 is a Pentium-based IBM compatible PC or other PC having at least 32 megabytes of RAM and at least 12 megabytes of hard disk space.

The hardware configuration also includes the development environment of a high-level, graphic, flow-control language such as tree view for pictorially specifying the structure and detailed interaction of a system of concurrent processes.

Figure 2:
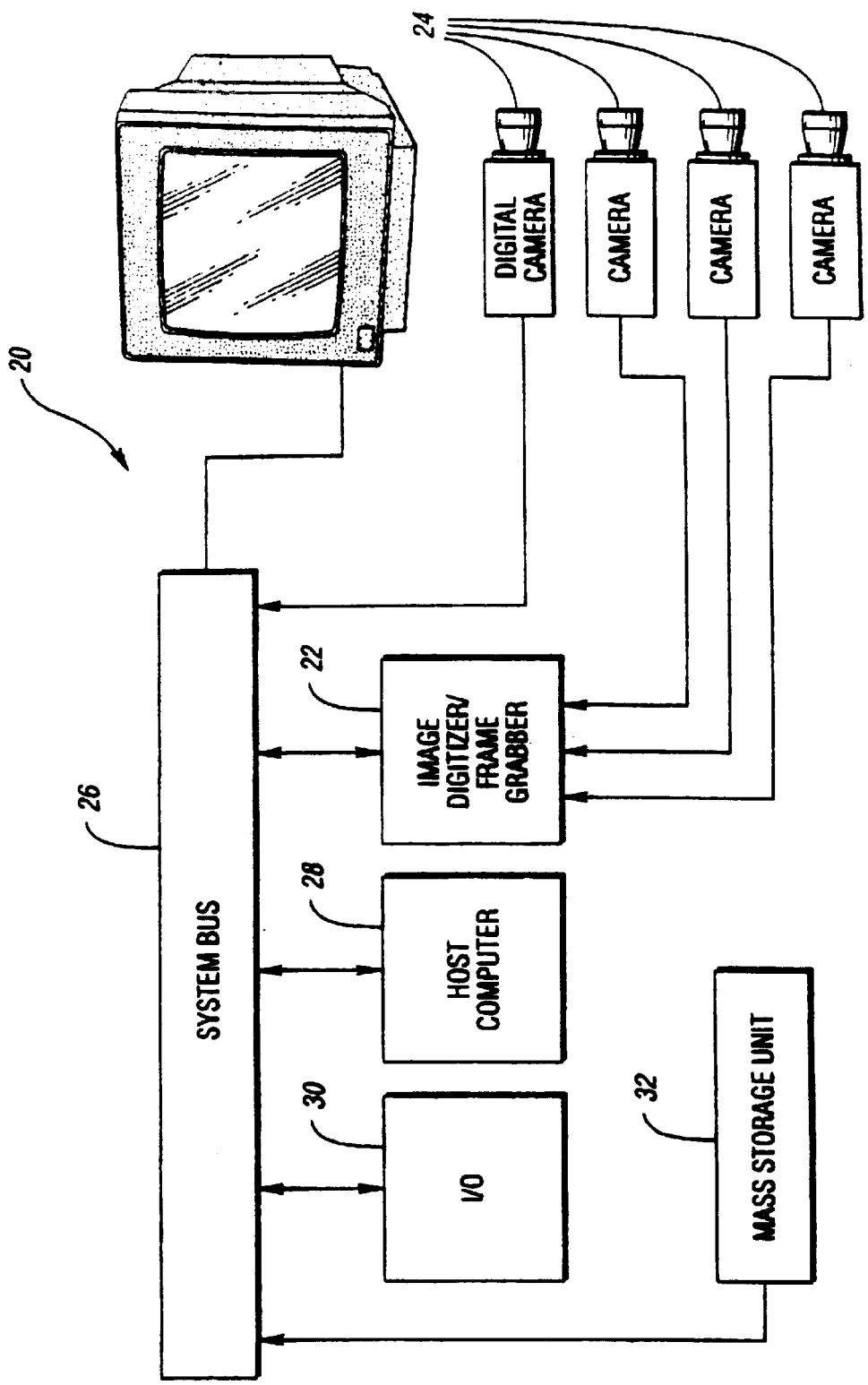
FIG. 2 is a schematic diagram illustrating a machine vision system which can be supported by the method and system of the present invention.

Referring now to FIG. 2, there is illustrated schematically a machine vision system generally indicated at 20 generally of the type which can be supported by the method and system of the present invention. The machine vision system 20 typically includes an image digitizer/frame grabber 22. However, it is to be understood that other methods are available to convey images to a computer system.

The image digitizer/frame grabber 22 samples and digitizes the input images from one or more image sources such as monochrome or color cameras 24 and places each input image into a frame buffer having picture elements. Each of the picture elements may consist of an 8-bit or higher number representing the brightness of that spot in the image.

The system 20 also includes a system bus 38 which receives information from the image digitizer/frame grabber 22 and passes the information on to the IBM compatible host computer.

The system 20 also includes input/output circuits 30 to allow the system 20 to communicate with external peripheral devices such as robots, programmable controllers, etc. having one or more stages.

One or more of the cameras 24 may be an image source such as an analog, digital, line scan or progressive scan camera such as RS-170, CCIR, NTSC and PAL. Also, 3D or "Smart" cameras may be used.

The system bus 26 may be either a PCI an EISA, ISA or VL system bus or any other standard bus.

The I/O circuits 30 may support a three axis stepper board (i.e. supports multiple axis control) or other motion control boards.

The image digitizer/frame grabber 22 may be a conventional frame grabber board such as that manufactured by Matrox, Cognex, Data Translation or other frame grabbers. Alternatively, the image digitizer/frame grabber 22 may comprise a vision processor board such as made by Cognex.

The machine vision system 20 may be programmed at a mass storage unit 32 to include custom controls for image processing, image analysis, third party machine vision products, calibration, and interactive CAD/geometry as described in greater detail hereinbelow. Examples of image processing may include linear and non-linear enhancement, morphology, color and image arithmetic. Also, image analysis may include search, edge, caliper, blob, template, color, 2-D and 3-D measurements.

Third party products may include digital I/O, various camera formats, motion, databases, SPC and others.

Calibration may include linear or non-linear, 2-D, 3-D and color calibration.

Also, interactive CAD/geometry custom control may be provided for both 2-D and 3-D space.

It is to be understood that other similar programming environments can be utilized by the method and system of the present invention.

Figure 3:
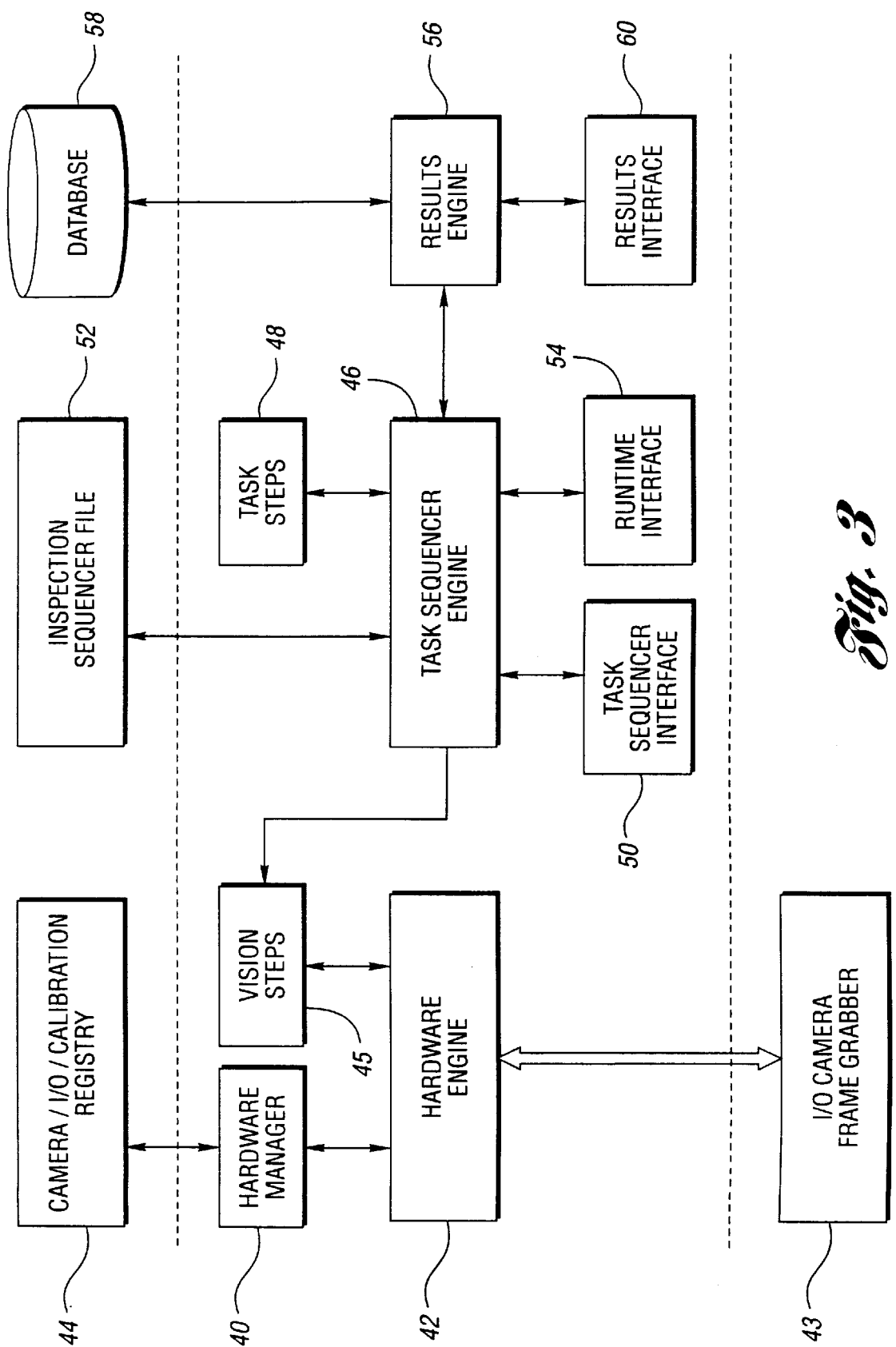
FIG. 3 is a block diagram flow chart of the various software (between the dashed lines), storage areas (above the upper dashed line), and hardware (below the lower dashed line) for use with the present invention with the flow of data and software being indicated by interconnecting lines.

Referring now to FIG. 3, there is illustrated in block diagram form various software and hardware components for interactively developing a graphical, control-flow structure and associated application software for use in the machine vision system 20 of FIG. 2 using the computer system of FIG. 1 without the need for a user to write any code. The method and system of the present invention "marry" the ActiveX-COM standard with the commonly used "tree view" method of navigation and hierarchy. The system allows for adding new machine vision functions. The design includes a method of controlling the flow of sequences based on conditional branches and forced routing changes.

Figure 4:
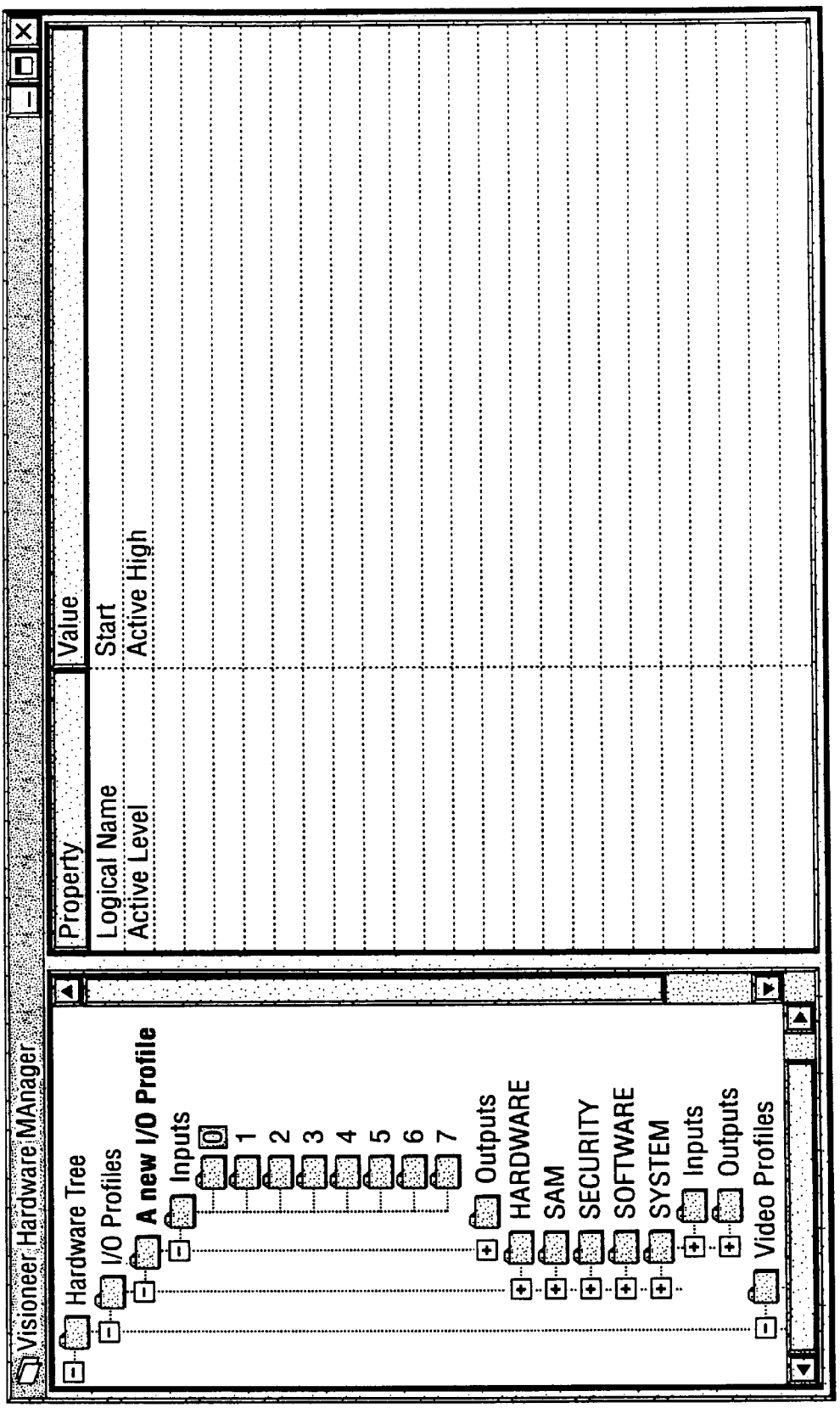
FIG. 4 is a screen display of the hardware manager of FIG. 3.

The hardware configuration is set by hardware manager 40 having an interface of FIG. 4 and coupled to a hardware engine 42 which, in turn, supplies COM drivers to the hardware of block 43. The primary methods for external interfaces include sockets for TCP/IP communication, named pipes, RS232, discrete I/O and Device net (an Allen Bradley proprietary I/O communication method).

Hardware operating parameters are stored in a camera/I/O/calibration registry 44 which correspond to possible hardware for use in the machine vision system 20. Commands are received from the user of the computer system of FIG. 1 to select a desired component of a user interface and desired hardware operation parameters corresponding to known supported configuration possibilities. This control program is linked with control programs or vision steps 45 to form application interactions directly with and through the hardware. Through the hardware manager 40, a user can configure and name the hardware components that are applied in these subsequent programs.

Figure 5:
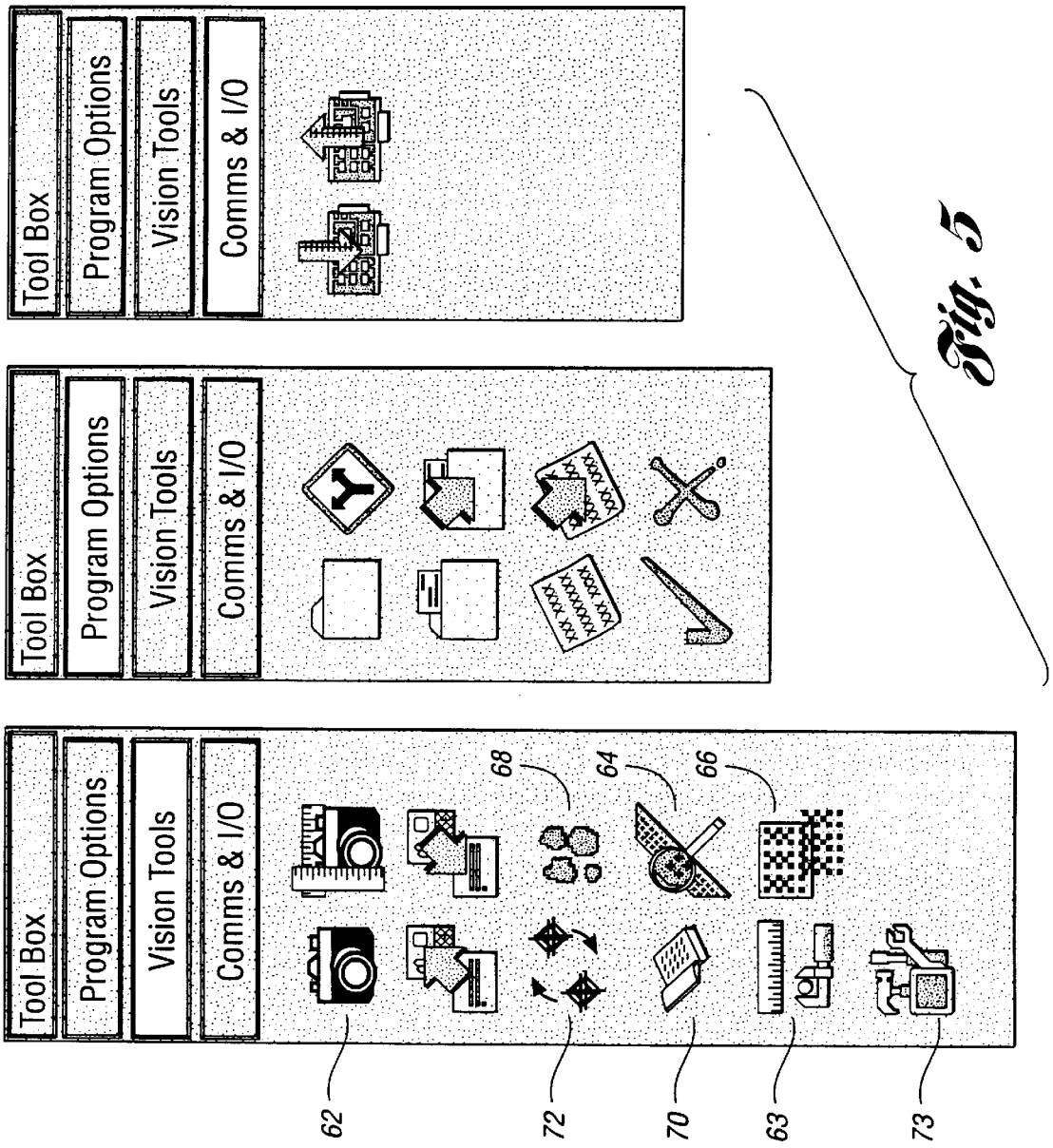
FIG. 5 are screen displays of various graphical tool bars of the present invention.
Figure 6:
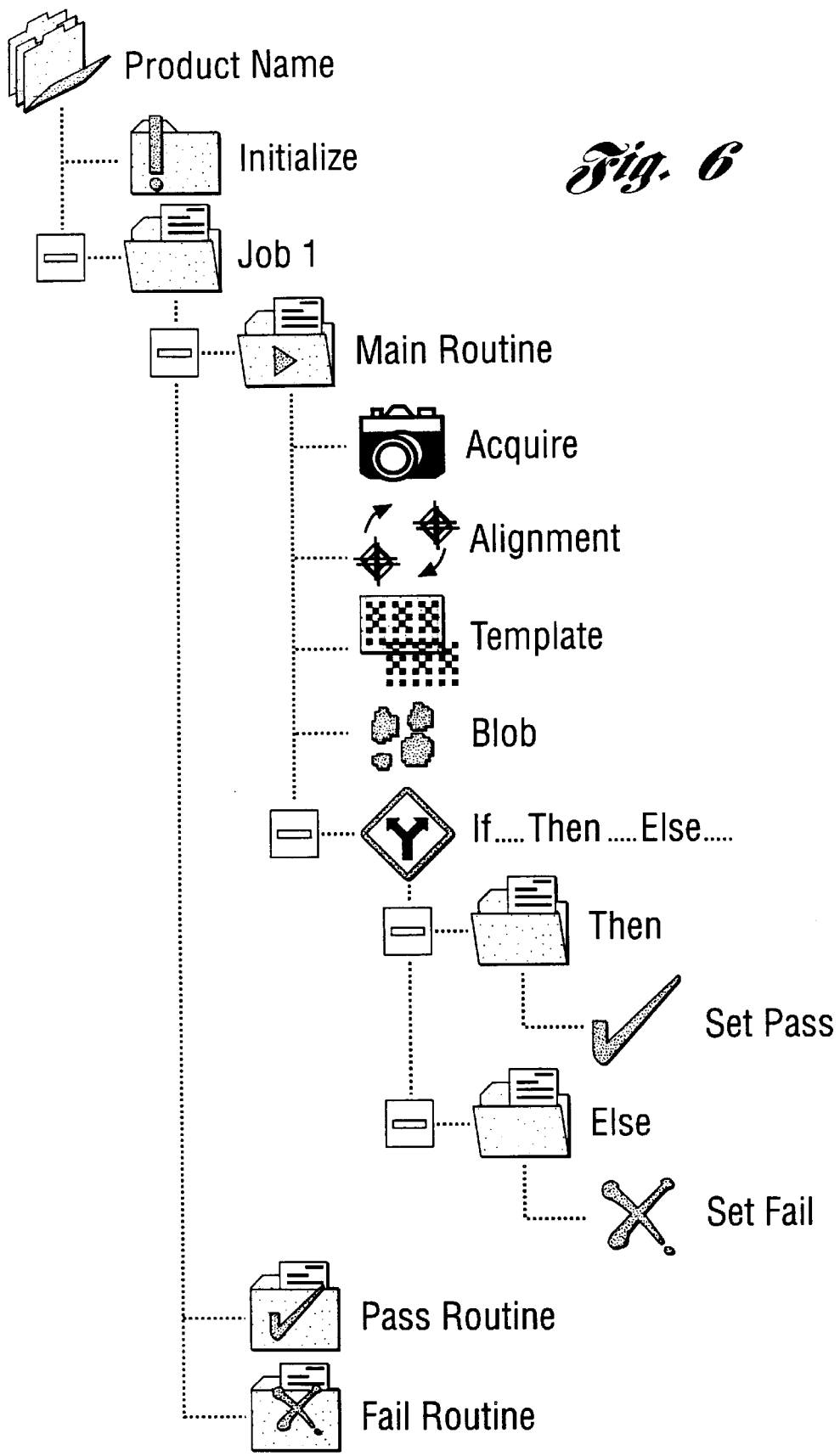
FIG. 6 is a screen display of a tree view based task sequencer list.

A design engine or task sequencer engine 46 is used to configure and test the flow and design of the application software as illustrated by an exemplary task sequencer list of FIG. 6. Graphical representations or icons are selected from the tool boxes of FIG. 5 which correspond to desired functional tasks and are linked into the tree structure of FIG. 6 by a task sequencer interface 50 in the desired locations.

The task sequence generation window illustrated in FIGS. 7–9 allows the user to acquire an image from a camera; process image; find rotation; set origin, set X axis; find model; find edge; blob; caliper; interact with I/O; and decisional branch, as described hereinbelow with respect to the tools of the tool boxes of FIG. 5.

Figure 7:
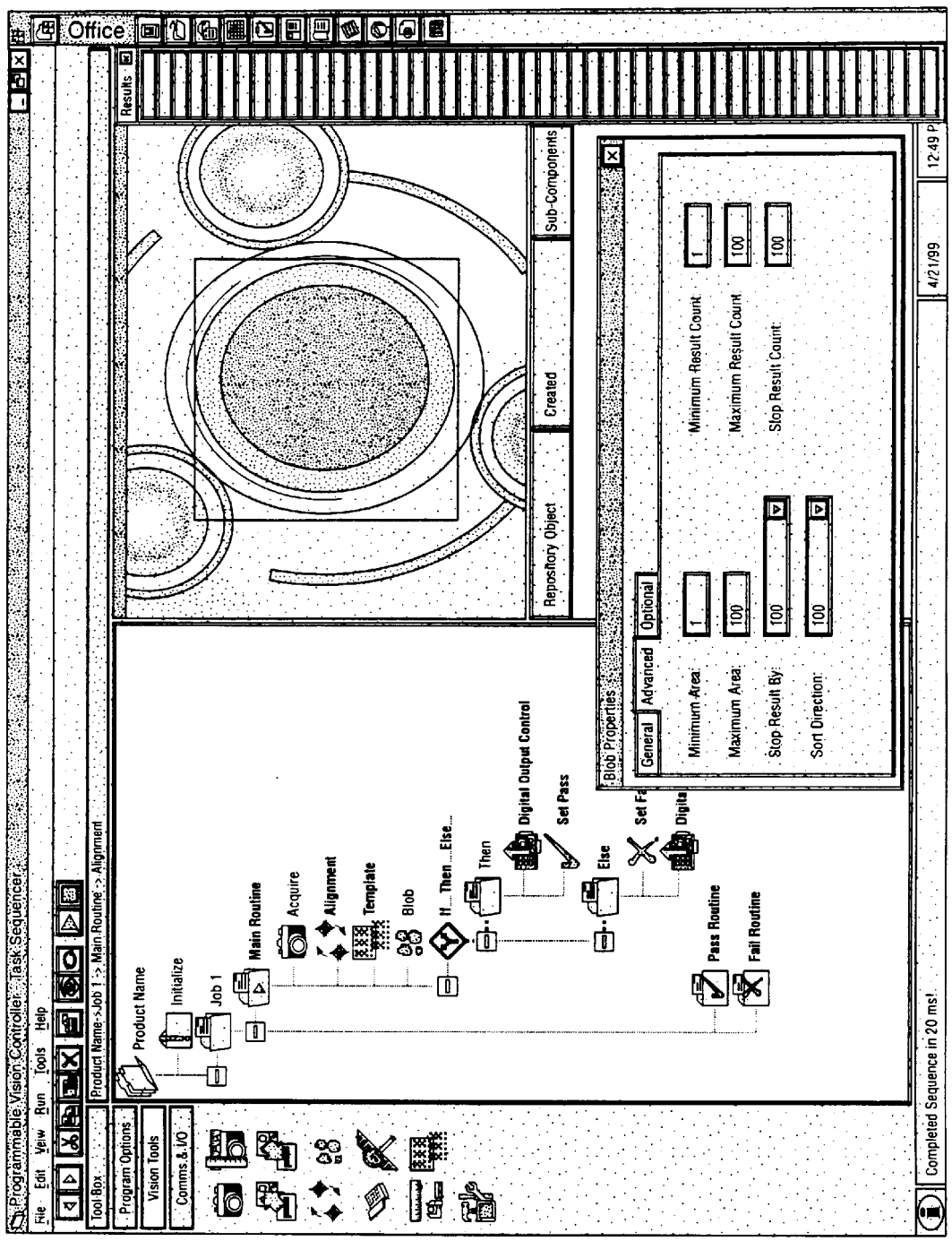
FIG. 7 is a screen display illustrating a task sequencer list with a parameters page for a blob tool and an image.
Figure 8:
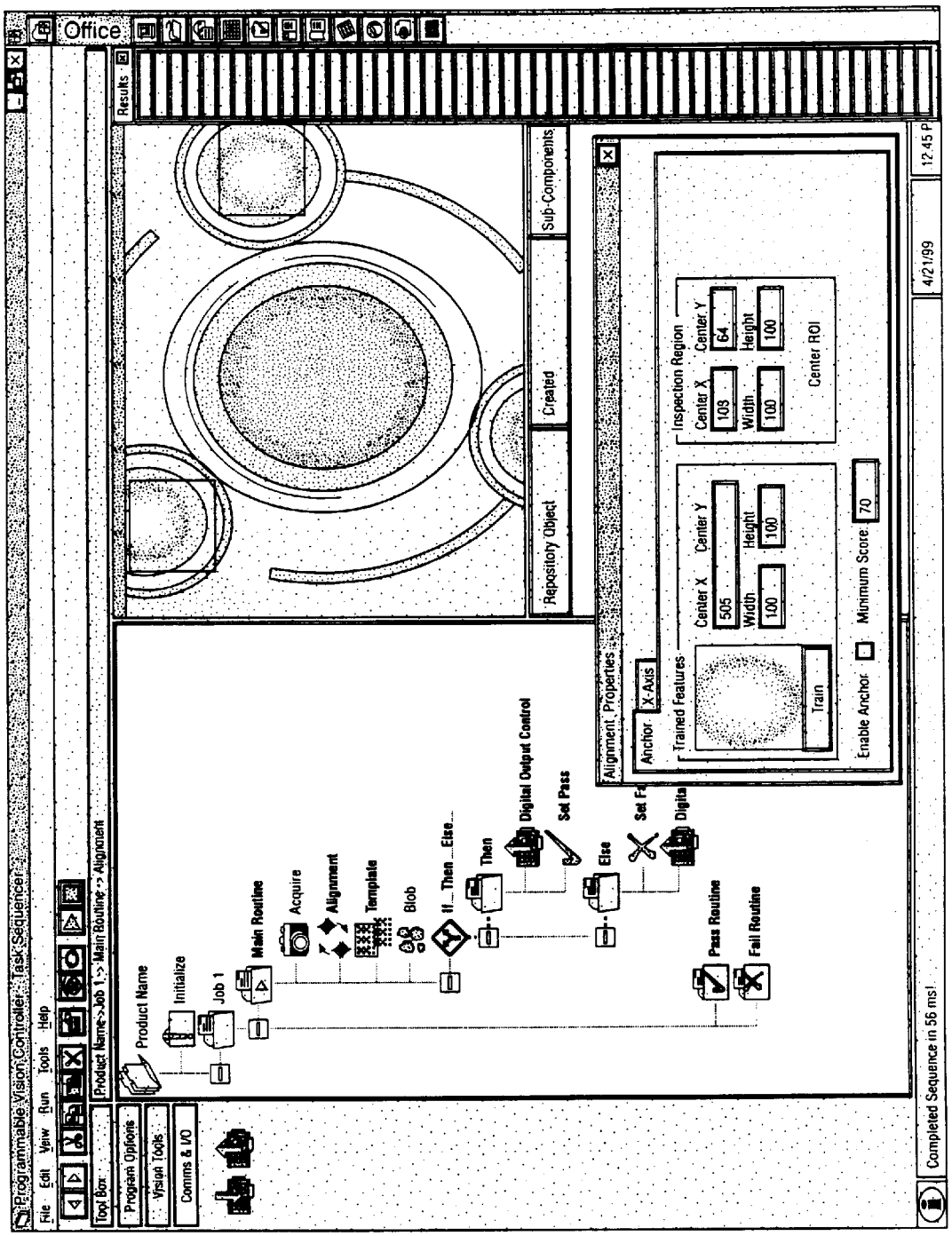
FIG. 8 is a screen display similar to the screen display of FIG. 7 with a parameters page for an alignment tool.

Parameters are configurable on each of the tasks where the parameters control the way the function generates results, as illustrated in FIGS. 7 and 8 with respect to the blob and alignment vision tools, respectively. Results of one step may be applied to subsequent steps. Execution of these sequences are topdown in nature, except where redirected. Once the desired sequence has been created, it can be stored or saved in a condensed method within an inspection sequence file 52 which is usable by the engine 46.

Figure 9:
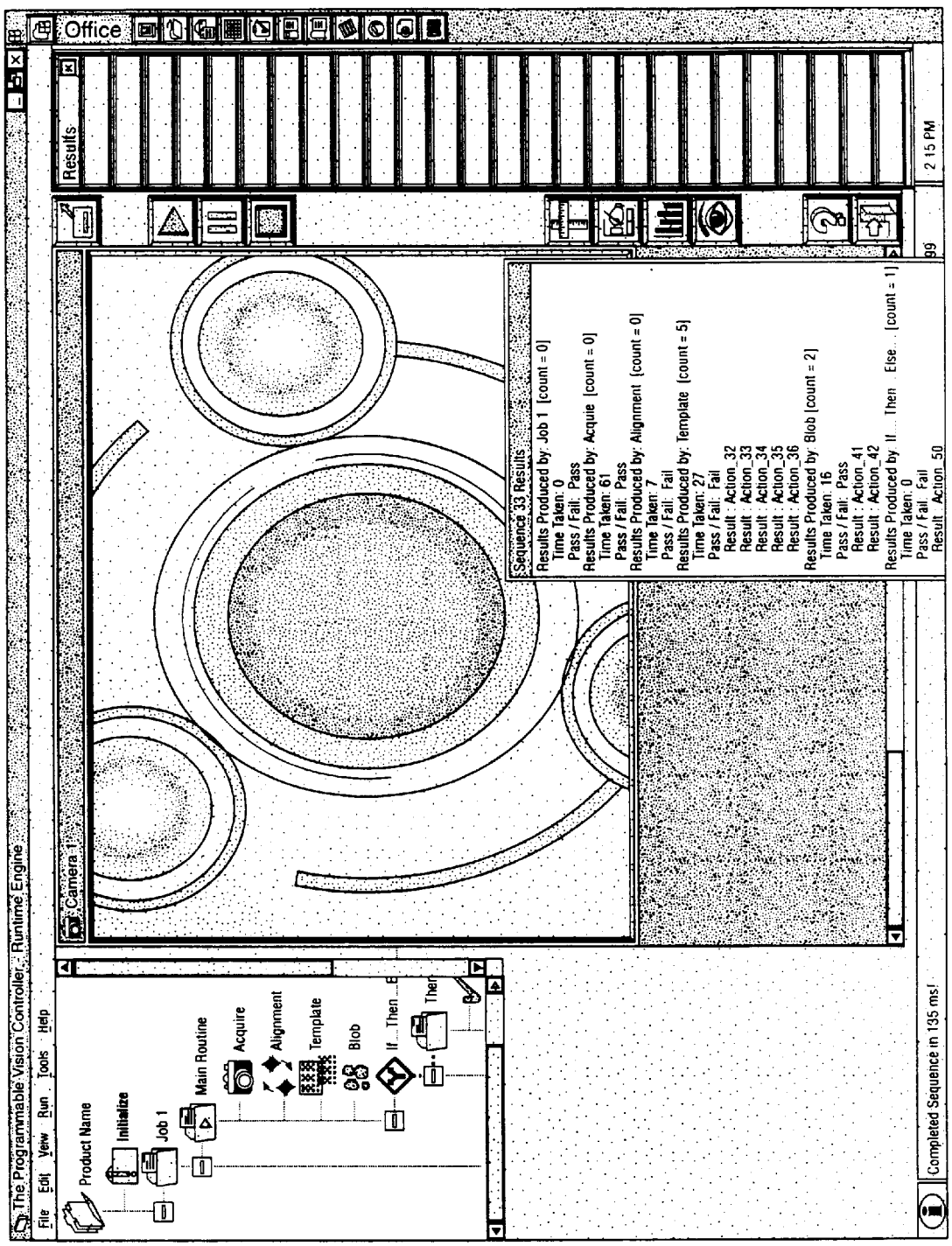
FIG. 9 is a runtime screen display with a rolling results window.

The engine 46 takes the condensed stored sequence from the file 52 and executes it through the runtime screen of FIG. 9 of the runtime interface 54. This engine 46 is interlinked with a results engine 56 for seamlessly communicating results obtained by executing the sequence. The engine 56 acts on inspection results by generating records within a database 58, accumulating pass/fail statistics, and stores images (generally failed images) within the database 58. The engine 56 provides active results in a rolling results window of FIG. 9 through a results interface 60.

Additionally, the system can communicate with other systems via a standard protocol over a network or serial communications port. The user can configure the system to act on the results of inspection by setting or clearing discrete output connections.

Referring again to FIG. 5, there are illustrated icons of a vision tools tool box, a program options tool box and a Comms & I/O tool box.

Each vision tool useful with the present invention is generally described as follows with reference to FIGS. 5 and 6:

A region of interest box (not shown in FIGS. 5 or 6) allows a user to define an image processing region by interactively editing a rectangular ellipsoidal or toroidal (donut) shape.

A camera or acquire control 62 allows a user to capture and store an image from a video camera.

Caliper. The caliper tool 63 is used to locate pairs of edges within an inspection image. A Region Of Interest (ROI) defines the area to be searched within the image and also the orientation of the edge pairs. The caliper tool 63 is typically used to measure component width by finding edges with sharp contrast changes. The caliper tool 63 generates pass/fail results based on its ability to find edge pairs that are within the specified image.

Feature Find. The feature find tool 64 is used to determine if an object is present within the image, and report its location. Before using the feature find tool 64, it must be trained on what to look for. If the feature find tool 64 finds a comparable object within its region of interest, a result point appears where the feature was found. If the object is not found, the tool 64 generates a failure.

Template. The template tool 66 is used to highlight and quantify the differences between a golden sample image and the current image. These differences are filtered as specified and displayed as errors on the sample image. The template tool 66 will generate a failure if the total number of error image elements exceeds the allotted number.

Blob. This tool 68 groups pixels that share a common border and threshold intensity together into objects called "blobs". The blob's geometric properties can be used to generate pass or failure results based on size or number of blobs found. The grey level intensity threshold ranges from 0 (black) to 255 (white). The blob tool 68 can be configured to look for dark, light or mid-range intensities.

Read Tool. The read tool 70 is a tool that can "verify" text within an image. A sample of these characters first needs to be trained. The read tool 70 is told to verify the expected text is present and readable. The result of the read is a simple pass/fail answer.

Aligment Tool. The alignment tool 72 aligns previously captured images by realigning the X-Y coordinate system.

One can customize the flow of an application in many ways. All of the following navigational tools can be found on the Program Options tool bar of FIG. 5 as illustrated further in FIG. 6.

Product Folder. A product folder represents the lowest level of the tree structure. Only one product folder can be viewed from the task sequencer at one time. The product folder should be thought of as a way to segment common areas of inspection. A product folder consists of initialization folders, job folders, and pass/fail folders.

Job Folder. A job folder contains initialization parameters, main routines (where the inspection sequences are added) and pass and fail routine folders. Multiple jobs can be run from within any product folder. If one would like to add additional jobs, this can be done by clicking on the job folder icon in the tool bar area, and dropping it onto the product folder.

Automated Tree Navigation. One can automate the navigation of the application through using I/O to direct which folder within the project will be executed. To do this, click on the job folder one wants to execute and view the parameters section for this job. Uniquely set the input channel, input value and time out parameters for each of your job folders. Now jobs will be run only when these parameters are satisfied.

If . . . Then . . . Else. One can use conditional branch steps (If . . . Then . . . Else) to react to results of any vision step. If the entry condition is in the required state, the vision steps contained under the then branch are executed. If the entry condition is not in the specified state, the steps under the Else branch are run. After adding the If . . . Then . . . Else step to the routine, configure it by exposing the properties. From the properties page, set the Inspection Step (available steps are shown in the pull down list for this property) and then set the required result condition for this step. Any vision steps are added to the Then and Else folders will be run when the case is appropriate.

Label - Go To Label. Labels can be used to add to the readability of an application. One may consider inserting a label to describe what is occurring during this portion of the inspection sequence. Additionally, one can use the Go To Label option to jump direction to the inspection steps contained at the label. Unlike the Call Routine step, Go To Label steps only jump to a location, but do not return back.

New Routine—Call Routine. One powerful way to enhance the readability of the product file is to combine frequently used steps into separate Routines. Now each time one wishes to run these steps, simply use the Call Routine step to jump to the routine, execute the steps within the routine and return back to the step following the call.

In general, it is possible to interactively and easily build machine vision applications or programs using the COM controls illustrated in FIG. 5 in the tree view programming system.

Two standards are being married together by the present invention to produce an open programmable/reconfigurable/teachable system that does not require the use of a software programming environment. These standards are tree view and the COM standard.

Hence, the advantages of marrying these two standards allows any COM components to be inserted within an environment that is familiar in the automation context. Secondly, by interrogating the properties, methods and events of these COM components operation control can be tailored by the user without doing any programming. Properties, i.e. data, can be exchanged between controls. Mathematical operation can be performed on this data. By selecting which method to call in a control, its operation is controlled. Finally, events control the flow of the logic.

This interactive tree view/COM environment is itself a COM component and so can be used as a component within another interactive tree view/COM environment.

The user starts top-down, i.e. he thinks measurement first and the system guides him to define the input's geometries.

System Overview

The Interactive tree view/COM environment System of the present invention uses image analysis techniques to perform image analysis and meteorology functions, i.e. calibrated measurement. Features such as lines, circles and points etc. can be found and measured. Complex shapes can be identified and verified.

Complete complex applications can be configured literally in minutes, and controlled remotely—using either a digital or a serial link.

The features of the system include:
Ease of Use
Calibrated Measurement Using Real World Units
Extensive Set of Inspection Commands
Efficient Use of Memory
Simple Digital and Serial Interfacing There are two phases in the operation of the system of the present invention:

Design Phase: Here the user, using the computer keyboard and monitor or touch screen monitor, configures the system for his application e.g. part identification or measurement.

Execution Phase: Once configured, the teach system can run completely automatically and can be controlled via an RS232 serial link or it's digital inputs.

In the first phase the user "designs" the system do a particular application. Using the computer keyboard 12 and monitor 10, the user "configures" the system for a particular application e.g. part identification, measurement etc. Use of the system is made easy by the menu-driven user interface which provides the user with all the commands in a structured and hierarchical manner. Help is available at all points in the program.

The system stores the particular sequence of commands that make the application into an application file. More than one application can be loaded at any one time.

In the second phase, applications can be executed at the press of a button on the keyboard or touch screen, a remote input, or triggered through the RS232 or other communications line. Automatic system diagnostics provide details of the performance of the application to the user, showing the nature and type of any problems.

All measurements are made in real world co-ordinates (m, mm, microns, in., thou., etc.).

Many commands are available to include meteorology (measurement) functions and image analysis functions. Examples of meteorology functions include the measurement of distances, angles, diameters, perimeter, areas, straightness, roundness and shape. Examples of vision functions include gray level edge finding (capable of finding subtle grey level edges), projection, edge sniffing and feature correlation.

System functions are as follows:

Uses drag-and-drop methodologies to create a hierarchical design through an "Explorer"-like interface (i.e. tree view);

Floating Toolbox of available actions/methods sub-classified into Vision Tools, Conditional/Program Flow, I/O and Communication Tools, Statistical Tools, Miscellaneous Tools;

Products sequences can migrate to other systems running the software of the invention;

The software of the invention offers database connectivity;

Initial configuration to allow multiple cameras, color or monochrome;

The application launches with last product loaded (this can be overridden with a specific product);

The runtime interface contains at least one Image Display Window, and a Rolling Results Window, a Start/Stop Inspection method, a Check Statistics method, a Change Inspection method, and an Exit method;

The Image Display Window in the runtime I/F displays/hides graphical location marks, blob areas, template defects, etc. depending on the state of the global graphics visible flag;

The Rolling Results Window uses the same pro forma as the Rolling Results Object currently used in the LCI Pro application;

The Start/Stop (Online/Offline) status of the system is indicated through icon changes;

The Task Sequencer Engine 46

Have a minimum tool set; Acquire, I/O and Communications, Find Models, ROI Resource;

The additional tool set will allow Find rotation, Translation, Set the origin point, and X and Y axis scaling, Find edges, Blob areas, Caliper, Template comparison, Perform decisional branching;

New tasks can be added without recompilation of the software of the invention.

The software of the invention is able to Save/Load product sequences.

The User Interface can be designed with Touch Screen design considerations incorporated, i.e. Virtual Keyboards, Large Buttons, and Fine Adjust controls for ROIs.

All interfacing to individual tools is through a Toolbox Object 73 (FIG. 5).

The Toolbox Object 73 is to expose all methods/properties at design-time and runtime, i.e. Train, Use.

The user is allowed to single step through the central sequence for debug/setup purposes.

Individual steps may be bypassed in single step mode or commented out in run mode.

Multiple tool instances.

Security considerations include restricted access to the Task Sequence, i.e. No access, read-only, modify no save, modify and save.

Image database facility is included so that all images captured within a single inspection cycle can be stored in their raw form if required.

Individual tool results are available to other tools within scope.

Data Interface

Several optional interfaces are suggested. These interface are NOT compulsory as the interactive tree view/COM environment can work without them. However, if any of these interface are present this extends the functionality to the tree view/COM environment.

This interface provides a set of defined methods and attributes obeying the COM standard.

| Display Methods (iDisplay) | |
| --- | --- |
| Draw | Draws the tool |
| ShowDisplayGraphicssplay | result graphics |
| HideDisplayGraphics | Hide result graphics |
| EnableAutoRefresh | Enables the tool to refresh the result display upon use |
| DisableAutoRefresh | Disables the tool from refreshing the result display upon use |
| IsAutoRefreshEnabled | Returns if the tool's auto refresh is enabled or disabled |
| Information Methods (iInformation) | |
| GetMemorySize | Returns the current quantity of heap, in bytes, which the tool is using |
| SetMaximumTime | Sets the maximum time allows for the use function to execute |
| GetMinimumTime | Returns the minimum time required for the use function to execute |
| TimeTaken | Returns the time taken by the Use function on the last use |
| GetMaximumTime | Returns the current setting for Use maximum time allowed for the function to execute |
| Data Access Methods (iData) | |
| GetInputType | Returns information regarding an input |
| GetOutput Type | Returns information regarding an output |
| GetNumberOfInputs | Returns the number of inputs |
| GetNumberOfOutputs | Returns the number of outputs |
| GetOutput | Returns a given output |
| SetInput | Set a given input |
| Tool Methods(iTool) | |
| AutoTrain | Automatic Training method for the tool |
| Train | Initiate training of the tool |
| AddSample | Add Sample to current training set for the tool |
| PrepareToUse | Prepares the tool for first use |
| Use | Uses the tool with the current trained information |
| GetLastError | Returns the last error generated by the tool |
| Save | Save tool configuration and training information to file |
| Load | Load tool configuration and training information to file |
| Serialize | Serializes the tool configuration to file |

While the best mode for carrying out the invention has been described in detail, those familiar with the art to which this invention relates will recognize various alternative designs and embodiments for practicing the invention as defined by the following claims.

What is claimed is:

1. A method for interactively developing a graphical control-flow structure and associated application software for use in a machine vision system, the structure including a control sequence having at least one node, the method comprising:

providing a first set of control programs representing possible machine vision tasks, the first set of control programs defining a first set of standard controls;

providing hardware operating parameters corresponding to possible hardware, the hardware operating parameters defining a second set of standard controls;

displaying graphical representations of possible hardware and possible machine vision tasks;

receiving commands from a user to select desired hardware operating parameters corresponding to desired hardware and a machine vision graphical representation and an associated first control program corresponding to a desired machine vision task;

displaying the structure wherein the selected machine vision graphical representation is a node of the structure, the first control program being linked into the structure;

providing a plurality of separate application processing engines including a results engine interlinked together for seamlessly communicating results obtained by execution of the selected first control program; and linking the selected first control program with the desired hardware operating parameters to form the application software in response to the commands without the user writing any of the application software.

2. The method as claimed in claim 1 wherein the results engine generates and stores records within a database based on the results.

3. The method as claimed in claim 1 wherein the desired hardware operating parameters correspond to a desired image source and wherein the results engine stores images from the image source within a database based on the results.

4. The method as claimed in claim 3 wherein the desired image source is a video camera.

5. The method as claimed in claim 1 further comprising the step of displaying the results.

6. The method as claimed in claim 5 wherein the step of displaying graphically displays the results.

7. The method as claimed in claim 6 wherein the step of displaying graphically displays the results within a rolling results window.

8. The method as claimed in claim 1 wherein the structure is a tree structure.

9. A system for interactively developing a graphical control-flow structure and associated application software for use in a machine vision system, the structure including a control sequence having at least one node, the system comprises:

a first set of control programs representing possible machine vision tasks, the first set of control programs defining a first set of standard controls;

hardware operating parameters corresponding to possible hardware, the hardware operating parameters defining a second set of standard controls;

means for displaying graphical representations of possible hardware and possible machine vision tasks;

means for receiving commands from a user to select desired hardware operating parameters corresponding to desired hardware and a machine vision graphical representation and an associated first control program corresponding to a desired machine vision task;

means for displaying the structure wherein the selected machine vision graphical representation is a node of the structure, the first control program being linked into the structure;

a plurality of separate application processing engines including a results engine interlinked together for seamlessly communicating results obtained by execution of the selected first control program; and means for linking the selected first control program with the desired hardware operating parameters to form the application software in response to the commands without the user writing any of the application software.

10. The system as claimed in claim 9 wherein the results engine generates and stores records within a database based on the results.

11. The system as claimed in claim 9 wherein the desired hardware operating parameters correspond to a desired image source and wherein the results engine stores images from the image source within a database based on the results.

12. The system as claimed in claim 11 wherein the desired image source is a video camera.

13. The system as claimed in claim 9 wherein the system further comprises means for displaying the results.

14. The system as claimed in claim 13 wherein the means for displaying graphically displays the results.

15. The system as claimed in claim 14 wherein the means for displaying graphically displays the results within a rolling results window.

16. The system as claimed in claim 9 wherein the structure is a tree structure.

17. A computer-readable storage medium having stored therein a program which executes the steps of:

providing a first set of control programs representing possible machine vision tasks, the first set of control programs defining a first set of standard controls;

providing hardware operating parameters corresponding to possible hardware, the hardware operating parameters defining a second set of standard controls;

displaying graphical representations of possible hardware and possible machine vision tasks;

receiving commands from a user to select desired hardware operating parameters corresponding to desired hardware and a machine vision graphical representation and an associated first control program corresponding to a desired machine vision task;

displaying a graphical control-flow structure wherein the selected machine vision graphical representation is a node of the structure, the first control program being linked into the structure;

providing a plurality of separate application processing engines including a results engine interlinked together for seamlessly communicating results obtained by execution of the selected first control program; and linking the selected first control program with the desired hardware operating parameters to form application software in response to the commands without the user writing any of the application software.

18. The storage medium as claimed in claim 17 wherein the results engine generates and stores records within a database based on the results.

19. The storage medium as claimed in claim 17 wherein the desired hardware operating parameters correspond to a desired image source and wherein the results engine stores images from the image source within a database based on the results.

20. The storage medium as claimed in claim 19 wherein the desired image source is a video camera.

21. The storage medium as claimed in claim 17 wherein the program further executes the step of displaying the results.

22. The storage medium as claimed in claim 21 wherein the step of displaying graphically displays the results.

23. The storage medium as claimed in claim 22 wherein the step of displaying graphically displays the results within a rolling results window.

24. The storage medium as claimed in claim 17 wherein the structure is a tree structure.

* * * * *